Feb. 4, 1947.                M. BRUSTOWSKY                 2,415,233
                              FEED MECHANISM
                           Filed July 2, 1942              5 Sheets-Sheet 4

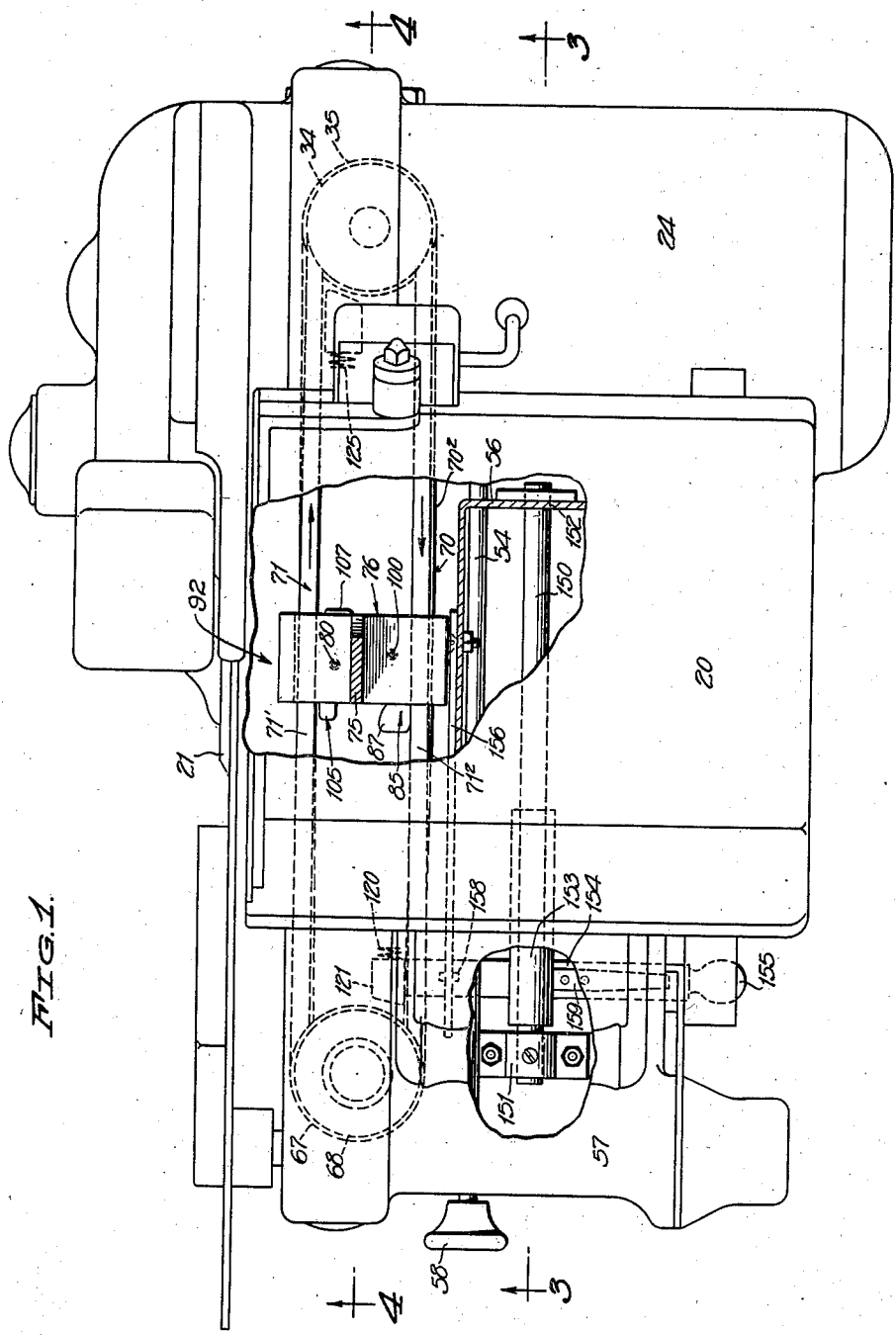

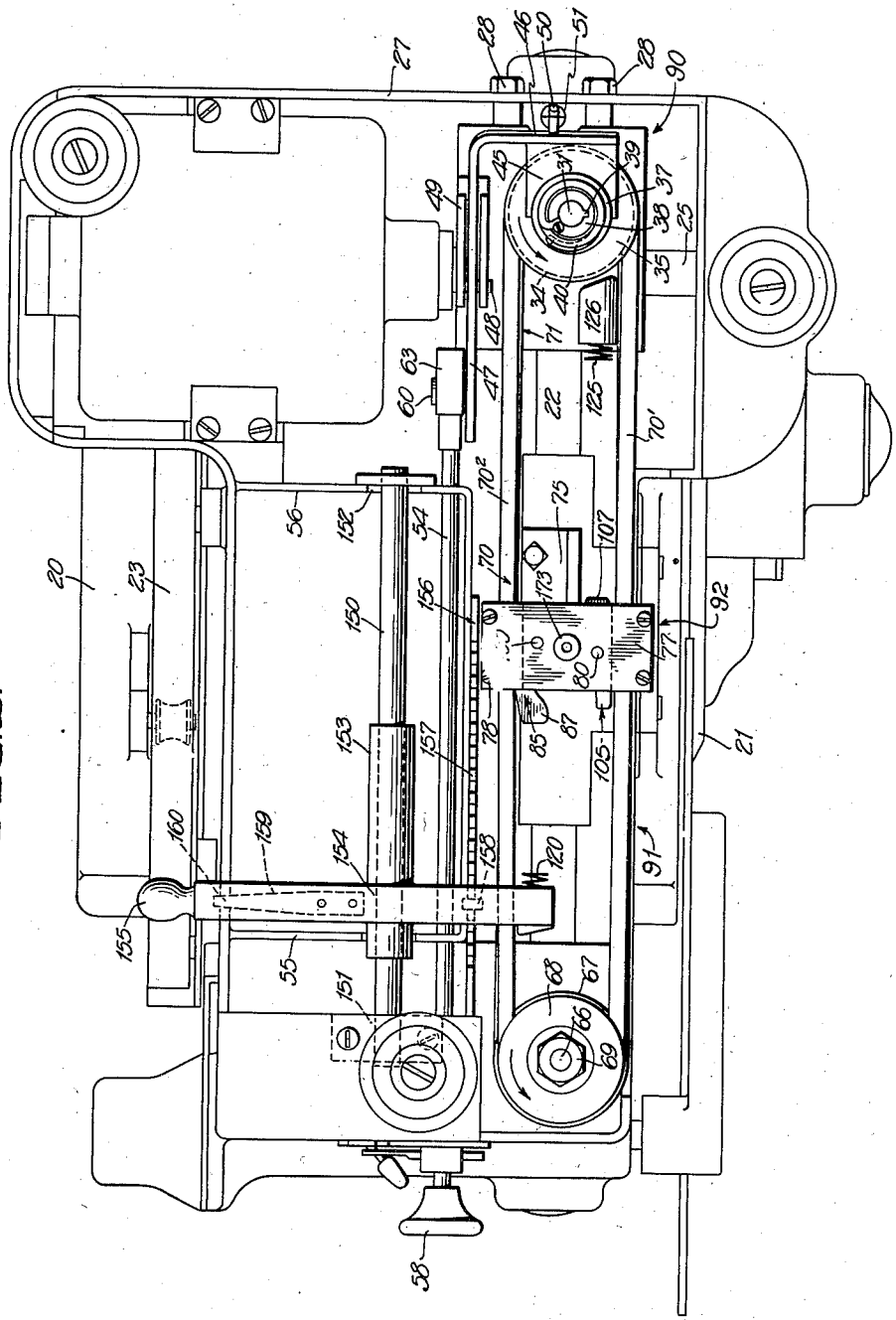

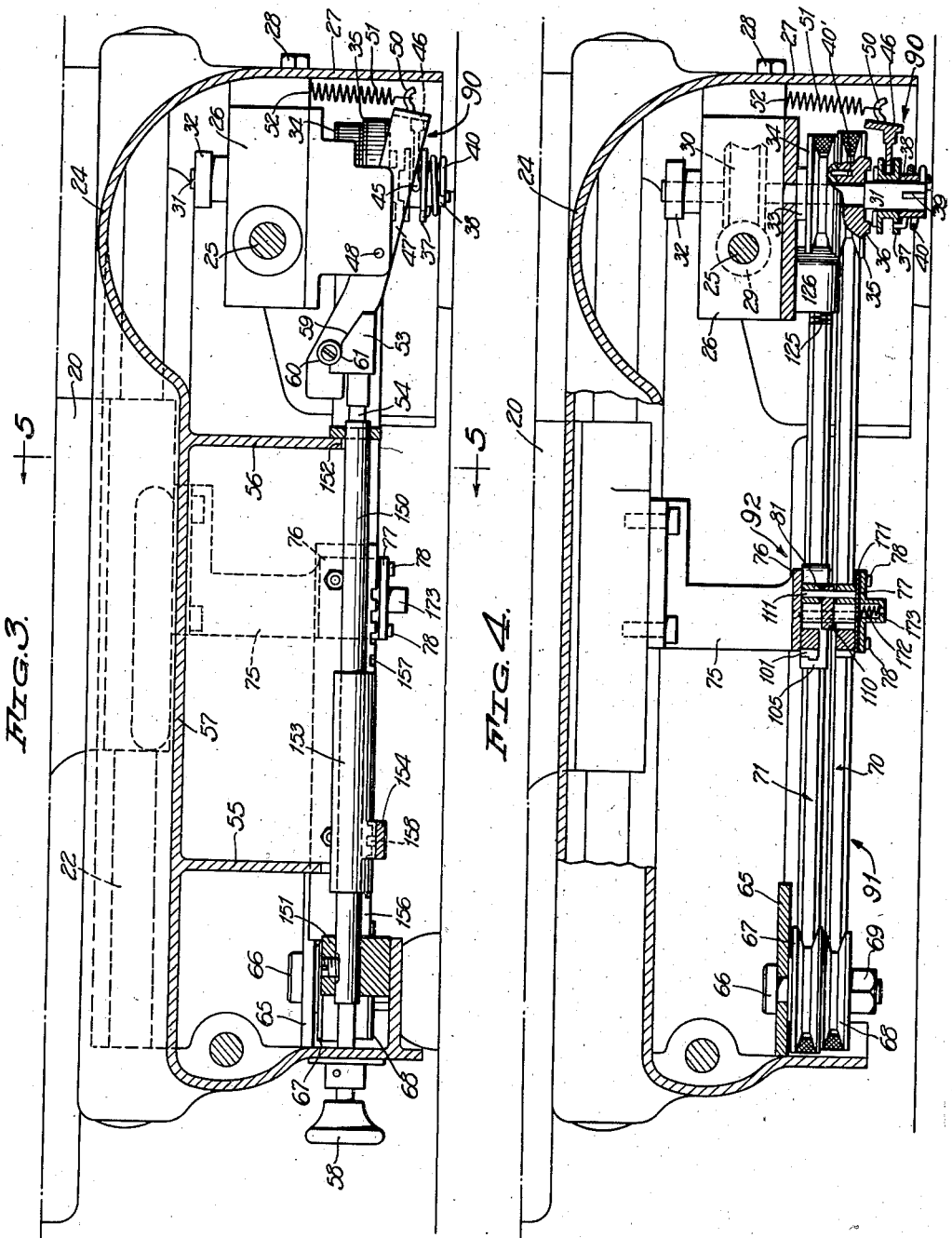

INVENTOR.
MORRIS BRUSTOWSKY.
BY Ely Pattison
ATTORNEYS.

Feb. 4, 1947.  M. BRUSTOWSKY  2,415,233
FEED MECHANISM
Filed July 2, 1942  5 Sheets-Sheet 5
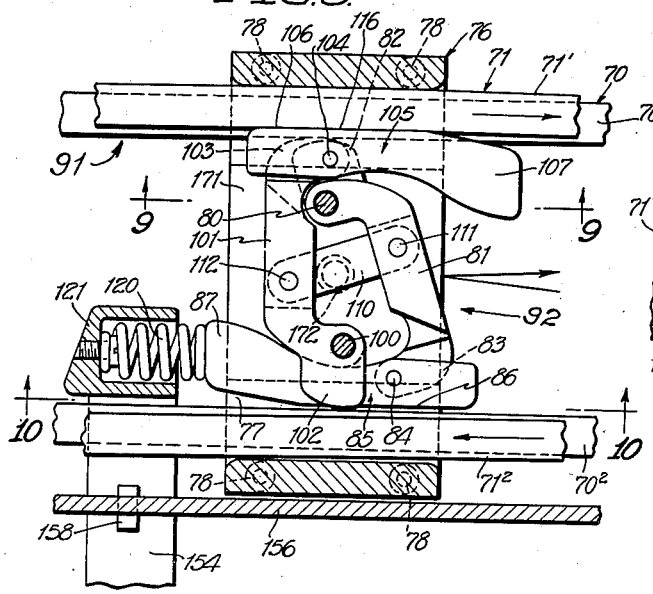
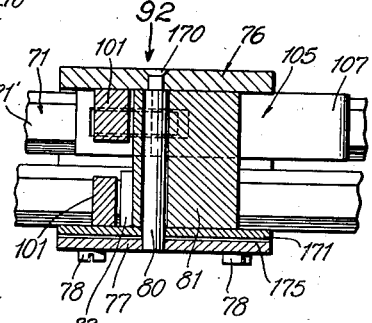
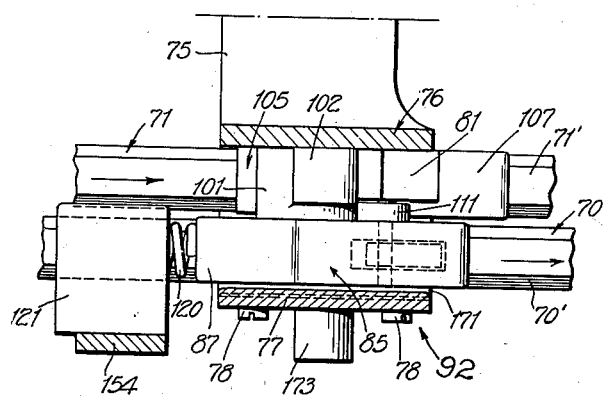
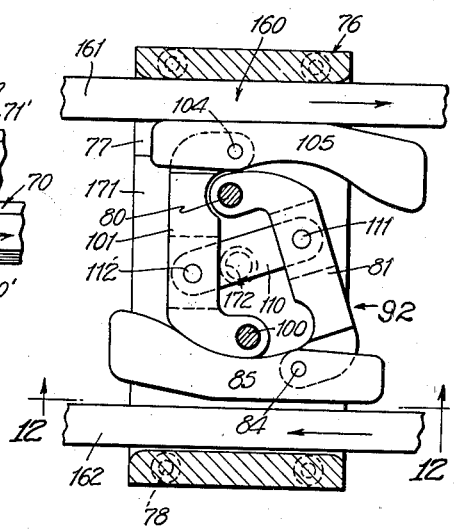
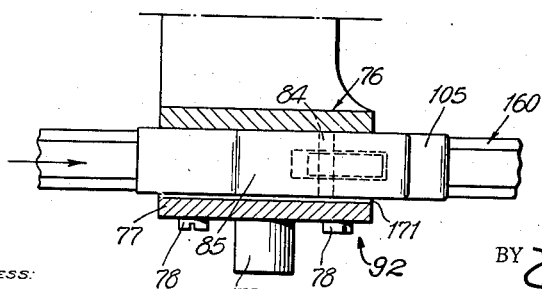
INVENTOR.
MORRIS BRUSTOWSKY.
BY Ely V Pattison
ATTORNEYS.

Patented Feb. 4, 1947

2,415,233

UNITED STATES PATENT OFFICE 2,415,233

FEED MECHANISM

Morris Brustowsky, Brooklyn, N. Y., assignor to U. S. Slicing Machine Company, La Porte, Ind., a corporation of Indiana Application July 2, 1942, Serial No. 449,425

11 Claims. (Cl. 146—102)

This invention relates to new and useful improvements in mechanism for converting motion and more particularly it pertains to a belt drive, reversing clutch mechanism for converting continuous rotary motion into intermittent reciprocating motion.

In its present embodiment, the invention has been illustrated in a feed mechanism for imparting reciprocating movement to the supporting table of a slicing machine. However, the invention is not limited to slicing machines, since it is adaptable either for a feed mechanism or for other purposes where it is desired to reciprocate a carrier or other member.

One of the objects of the invention is to provide novel mechanism for such a transmission whereby the distance or zone of travel of the carrier or reciprocating member may be varied at will within, of course, certain limitations.

Another object of the invention is to provide novel two speed mechanism for such a transmission whereby the movement of the carrier may be at a higher rate of speed during one interval of its travel than in another. As illustrated, the higher rate of speed is used during the interval that the carrier is being returned away from the cutting knife and the lower rate is used when the carrier is being moved toward the knife. The latter movement takes place during the cutting interval in the reciprocation of the carrier. This second object is quite important since the operating speed of a machine to which the mechanism is applied is increased over that of machines wherein the speed of travel of the carrier or reciprocating member is constant.

Still another object is to provide a new and improved form of reversing clutch which is adapted for use within a belt drive and reversing clutch transmission.

Numerous other objects and advantages will be apparent throughout the progress of the following specification.

The accompanying drawings illustrate one embodiment of a device incorporating the features of the present invention in which:

Figure 1 is a top plan view, partly broken away for clarity, showing a meat slicing machine which incorporates the present invention;

Figure 2 is an inverted plan view of the machine;

Figure 3 is a vertical sectional view on the line 3—3 of Figure 1;

Figure 4 is a vertical sectional view on the line 4—4 of Figure 1;

Figure 8 is an enlarged scale detail sectional view illustrating the belt gripping shoes and their operative connecting mechanism, the parts being shown in the opposite position to that in which they are illustrated in Figure 7;

Figure 9 is a detail sectional view on the line 9—9 of Figure 8;

Figure 10 is a detail sectional view on the line 10—10 of Figure 8;

Figure 11 is a detail sectional view of an alternative construction and illustrates the manner in which the invention may be employed with a single driven belt instead of with the two belts shown in the preceding figures; and Figure 12 is a detail sectional view on the line 12—12 of Figure 11.

General description

Figure 5:
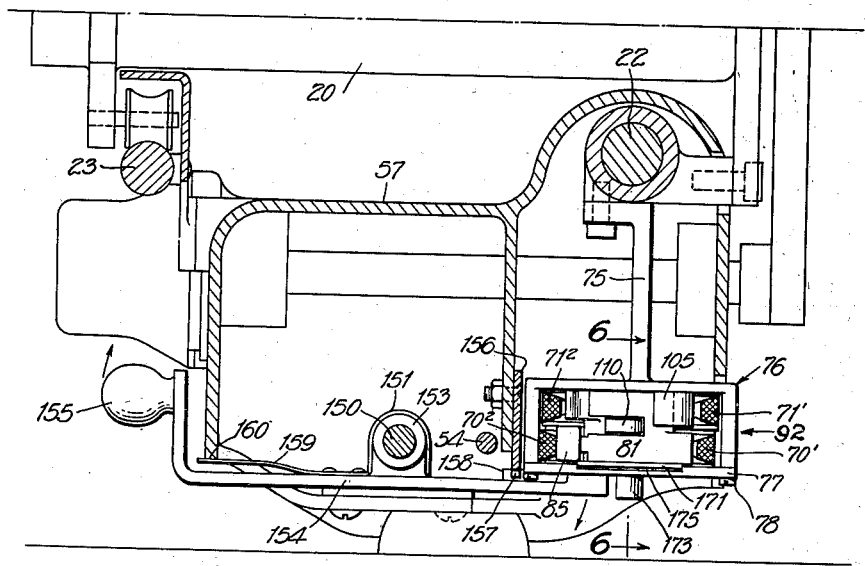
Figure 5 is an enlarged scale vertical sectional view on the line 5—5 of Figure 3.
Figure 6:
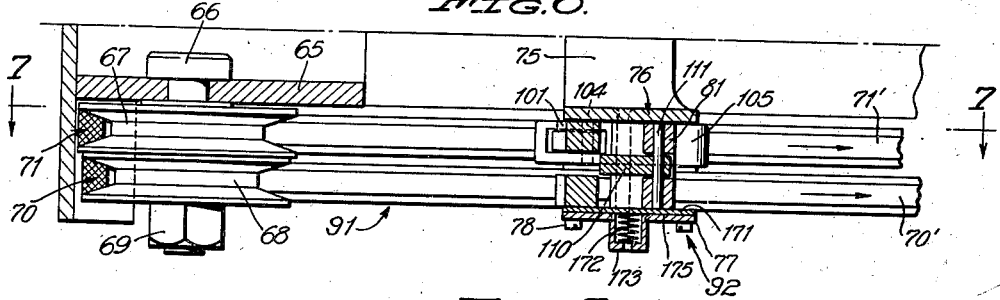
Figure 6 is an enlarged scale detail sectional view on the line 6—6 of Figure 5.

The particular slicing machine herein disclosed for the purpose of illustrating the invention incorporates any suitable base to properly support and house all of the constituent parts. Toward the rear of the base there is a generally elongated dome shaped housing 24 (Figs. 1, 3 and 4) for the drive motor of the machine. The motor housing continues downwardly to form the rear wall 27 of the base and extends forwardly to form the upper surface 57 of the base. The motor housing and its several extensions thus form a convenient protective covering for many of the operating parts of the machine. A front bracket 55 and a rear bracket 56 preferably are made integral with the base and extend downwardly to enforce rigidity to the base and to serve as supports for some of the operating mechanism.

A circular slicing knife 21 is rotatably supported at the left side toward the rear of the machine and is driven from the motor and the motor drive shaft 25 through any suitable transmission.

A carriage or carrier 20 is provided to support the substance to be sliced and is adapted to be reciprocated past the knife in a rectilinear path. The carriage is carried above the base of the machine and is supported by two longitudinal bearings 22 and 23 (Figs. 2 and 3). Bearing 22 is securely fastened within the base toward the left hand side almost directly below the cutting edge of the knife and the bearing 23 is securely fastened outside of the base to form an outboard support for the carriage (Fig. 5). The substance carriage may be reciprocated either manually or mechanically.

The mechanism to reciprocate the table mechanically is a novel and an improved form of belt drive and reversing clutch transmission. The drive from the motor shaft 25 (Figs. 3 and 4) is transmitted through a gearbox 26 and through a selective clutch, 90, to a belt drive 91. A reversing clutch, 92, is secured to a bracket 75 which depends from the carriage 20. The reversing clutch overlies the belt drive and converts the rotary motion of the motor shaft 25 to reciprocating linear motion for reciprocating the carriage.

Belt drive

Motive power from the motor shaft 25 is transmitted through the gearbox 26 to the vertical drive shaft 31 through the medium of a driving gear 29, mounted on the motor shaft 25, and a driven gear, 30, mounted on the drive shaft 31. The gearbox 26 is secured to the rear wall 27 of the base with several bolts 28 and supports the drive shaft 31 within an upper bearing 32 and a lower bearing 33. Power from the drive shaft 31 is transmitted through the selective clutch 90 to two driving pulleys 34 and 35 loosely mounted upon the drive shaft. Preferably the upper pulley 34 has a smaller diameter than the lower pulley 35 so that the peripheral speed of the latter will be higher than that of the former. The two driving pulleys 34 and 35 are interconnected with a pin 40' whereby both have the same rate of rotation.

The two belts 70 and 71 (Figs. 2 and 4) of the belt drive are preferably of the V type and extend between the driving pulleys 34 and 35 and two idler pulleys 67 and 68. The idler pulleys are rotatably and independently mounted at the front of the machine upon a vertical shaft 66, being secured thereto by means of a nut 69. The vertical shaft 66 depends downwardly from a bracket 65 which is securely fastened within the base toward the front. The upper idler pulley 67 preferably has the same diameter as the lower driving pulley 35 and the lower idler pulley 68 has the same as the upper driving pulley 34 so that the same length of belt may be used for both the upper belt 71 and the lower belt 70. The lower belt 70 travels at a higher rate of speed than the upper belt 71 for the reason that the lower belt is driven by pulley 35 whereas the upper is driven by driving pulley 34; pulley 35 having the larger diameter and the higher peripheral speed.

Selective clutch

The selective clutch for coupling and uncoupling the belt drive from the source of power comprises two coupling members. One of which is the driving pulley 35 (Figs. 2, 3 and 4). The under surface of pulley 35 is provided with projections 36 and interdental spaces which coact with corresponding projections and interdental spaces upon the upper surface of a constantly revolving mating coupling member, the clutch collar 37. The clutch collar 37 is slideably mounted upon the drive shaft 31 so that it may be moved toward and away from the pulley 35 to engage and disengage the clutch. In order to take up various shocks which may be encountered in the operation of the mechanical drive of the carriage, the clutch collar 37 is provided with yieldable means to prevent its rotation with respect to the drive shaft 31 in lieu of the usual rigid means. As disclosed a collar 38 is rigidly secured to the drive shaft 31 by means of a key 39, and the rotation of the shaft 31 is transmitted to the clutch collar 37 by means of a coil spring 40, which absorbs any mechanical shocks in the transmission. One end of the coil spring is fastened to the collar 38; the other end to the clutch collar 37.

The shocks resulting from the operation of the reversing clutch and from the sudden reversal of direction of travel of the table or carrier, is absorbed by the spring 40 which permits a slight rotary movement of the clutch collar 37 with respect to the shaft 31. This construction provides a yielding driving connection which absorbs these shocks to produce a smoothly operating machine.

The clutch collar 37 may be moved into and out of engagement with the pulley 35 by means of a clutch operating fork 45 which engages an annular groove on the outer periphery of the clutch collar. The clutch fork is rigidly fastened to a supporting angle 46 of a lever 47. The entire clutch fork assembly, comprising the clutch collar, supporting angle and lever, preferably is made integral and is pivoted at 48 to a bracket 49 which depends from the gearbox 26. If the clutch collar assembly is pivoted clockwise to the position shown in Figs. 3 and 4, the clutch fork moves downwardly and disengages the clutch. If it is pivoted counter-clockwise then the clutch fork moves upwardly and engages the clutch.

A spring 51 is connected between a stationary point 52, on either the base of the machine or on the gearbox 26, and a hook 50 on the angle 46 of the clutch fork assembly. This spring is always under tension and tends to move the clutch fork assembly in a counter-clockwise direction to keep the clutch in engagement.

To disengage the clutch, the clutch fork assembly is pivotally moved in a clockwise direction by moving inwardly a knob 58 on the front of the base of the machine. The knob 58 is securely fastened to the front end of a clutch operating rod 54 which is slideably mounted in bearings carried by the front bracket 55 and the rear bracket 56 depending from the top wall 57 of the base. The rear end of the clutch rod 54 supports a cam 53. The upper surface of the cam 53 is provided with an inclined cam face 59 bearing a detent 61 in the upper front portion of the cam face. A cam roller 60 is rotatably supported at the front of the lever 47 of the clutch fork assembly and cooperates with the cam face 59 and the detent 61.

When the knob 58 is moved inwardly the clutch rod 54 moves rearwardly and carries with it the cam 53. Rearward motion of the cam 53, causes the cam roller 60 to rise on the cam face 59 until it drops into the detent 61. This motion causes the clutch fork assembly to pivot in a clockwise direction to disengage the clutch. The clutch is maintained in its disengaged position against the action of the spring 51 by the cooperation of the cam roller 60 with its mating detent 61. To engage the clutch, the knob 58 is moved outwardly. This withdraws the cam 53, the cam surface 59 and the detent 61 from cooperation with the cam roller 60 and permits the spring 51 to pivot the clutch fork assembly in a counter-clockwise direction to engage the clutch.

Reversing clutch

Figure 7:
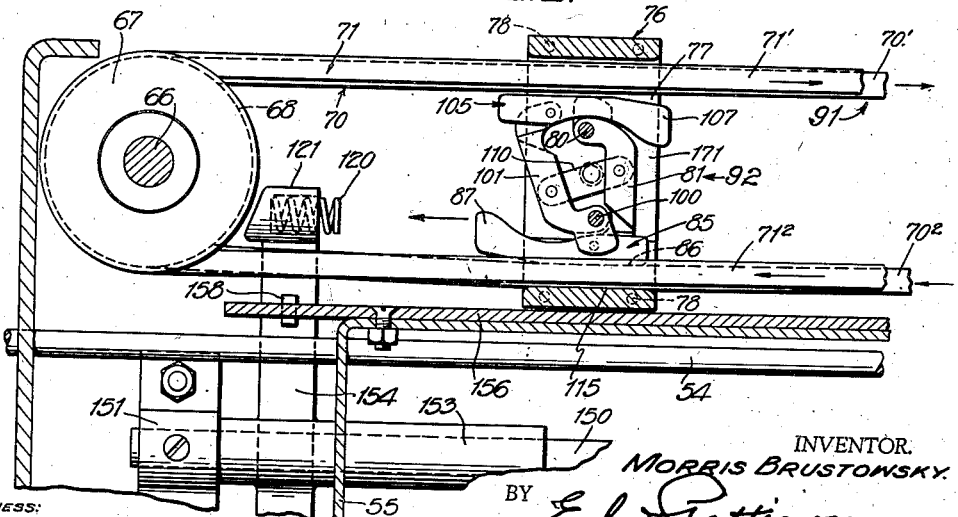
Figure 7 is a detail sectional view on the line 7—7 of Figure 6.

The reciprocating table 20 is alternately operatively connected to the belts 70 and 71 and is given reciprocating movement relative to the knife of the machine through the action of the reversing clutch. A bracket 75, which is suitably secured to and depends from the carriage or carrier 20, supports the housing 76 of the reversing clutch (Figures 7 and 8). The housing is closed by a removable lower wall 77 being secured by cap screws or the like 78 (Figures 4 and 10). Both reaches of both belts 70 and 71 pass through the housing 76, the reaches being parallel to one another.

A bolt or shaft 80 (Figs. 7 to 10), extends vertically through the housing 76 near the left side thereof and is supported by the top and bottom walls of the housing; a bolt or shaft 100 similar to the bolt or shaft 80 is located near the right side.

These two bolts or shafts 80 and 100 are slightly off-set with respect to each other (Fig. 8).

The bolt or shaft 80 forms a pivotal support for a lever 81 and shaft 100 forms one for lever 101. A lug or ear 82 extends from one end of lever 81 and a belt gripping shoe 85 is pivotally mounted at 84 on the other end 83 of lever 81. Similarly, and in reverse, a lug or ear 102 extends from one end of the lever 101 and a belt gripping shoe 105 is pivotally mounted at 104 on the other end 103 of lever 101.

Belt gripping shoes 85 and 105 each have an elongated body, one edge of each being formed with a straight portion respectively 86 and 106 which constitutes the belt engaging face of each shoe. One end of each gripping shoe is slightly off-set as at 87 and 107. The pivotal point 84, 104 of each gripping shoe is located at a point further removed from the off-set end 87, 107 of each shoe than it is from the opposite end thereof. Levers 81 and 101 are connected intermediate their ends by a link 110 which is pivotally connected at 111 to the link 81 and at 112 to the link 101. Pivotal points 111 and 112 are located upon opposite sides of a center line extending transversely through the housing whereby the link 110 is positioned at an angle with respect to a center line.

Gripping shoe 85 is positioned on a lower level than gripping shoe 105 so that it engages the reach 70² of the belt 70. As shown, the reach 70² moves from rear to front. Gripping shoe 105 is positioned at the higher level and grippingly engages the reach 71' of the belt 71 which moves from front to rear. When each gripping shoe is moved into gripping engagement with its respective reach of its belt, it clamps the belt between its gripping face and the respective side of the housing as at 115 in Figure 7 and 116 in Figure 8.

While the housing 76 and the gripping shoes and associated parts may take various forms, the bolts or shafts 80 and 100 are reciprocably secured rigidly to one wall of the housing as at 170 in Figure 9. The levers 81 and 101, the gripping shoes 85 and 105 and the connecting link 110 may be pivotally connected to provide a single unit which may be placed bodily in and removed from the housing simply by placing the levers 81 and 101 upon their respective shafts or bolts 80 and 100. This unit may be retained in the housing by means of a yielding plate 171 interposed between the removable wall 77 and the housing 76 (Figures 4 and 5). The inner face of the removable wall 77 is recessed as at 175 to receive plate 171 which is yieldingly forced against the housing and said unit by means of a coil spring 172. Spring 172 is mounted in a housing 173 carried by the removable wall 77 of the housing 76 (Figure 4).

Stroke adjustment

Through the agency of mounting the abutment 120 for adjustment with respect to the abutment 125, the gripping shoe 85 grips its respective reach 70² of the belt 70 at a preselected point along its length of travel and permits the adjustment of the distance of travel of the carriage or table (Figs. 1, 2 and 3). A rod or bar 150 is suitably mounted as at 151 and 152 in the base of the machine and furnishes a slideable and a rockable support for a sleeve 153. A transverse flat bar 154 is secured to the sleeve 153 and is provided upon its outer end with an operating knob or handle 155. The abutment 120 is mounted upon the inner end of the bar 154 and is placed so that it will be in the path of travel of the off-set end 87 of the gripping shoe 85.

A toothed bar 156 having a series of teeth 157 in its under or lower edge is rigidly carried by the base of the machine and extends parallel with the rod or bar 150. A lug or the like 158 (Figure 2) is mounted upon the upper surface of the bar 154 and is adapted to engage between any two of the teeth 157 of the toothed bar 156 to maintain the bar 154 in any preselected position. One end of a flat spring 159 is secured to the bar 154 and its free end engages the under edge of one side wall of the base as at 160. The spring 159 urges the lug or tooth 158 into engagement between the teeth 157 of the toothed bar 156 and thereby holds the bar 154 and the abutment 120 in the desired preselected positions.

One belt variation

In addition to the two belt transmission some of the advantages of applicant's construction may be obtained with but one belt. Such an embodiment of the invention has been illustrated in Figures 11 and 12, wherein one reach of a belt 160 is designated 161, and the other reach is designated 162. In the alternative form the housing 76 and the belt gripping shoes, their associated parts and their operation are identical with those in the originally described form, except that the gripping shoes 85 and 105 are on the same level alternately to grip the opposite flights of a single belt instead of the opposite flights of two parallel belts. The gripping shoe 85 engages the flight 162 of the belt 160 to move the housing 76 to the front and the gripping shoe 105 engages the flight 161 of the belt 160 to move the housing to the rear.

Operation of machine

The operation of the reversing clutch belt drive transmission is shown in Figure 7 wherein the housing 76 is moving from rear to front and shoe 85 grips the reach 70² of the belt 70 between its gripping face 86 and the side of the housing 76, whereas the gripping shoe 105 is free with respect to the reach 71' of the belt 71. As the housing continues to travel towards the front, the off-set end 87 of the gripping shoe 85 engages a coil spring abutment 120 mounted in a housing 121. This engagement moves the shoe longitudinally a slight distance and through the medium of the pivotal connection 84 between the gripping shoe 85 and the lever 81, rocks the lever 81 about its pivotal point in a counter-clockwise direction on the bolt or shaft 80 and serves to disengage the gripping shoe from reach 70² of the belt 70 to release its grip thereon. In addition, the lever 101, through the pull exerted on the link 110, rocks about its pivotal point upon the bolt or shaft 100 in a clockwise direction to the position illustrated in Figure 8. This moves the gripping shoe 105 into engagement with the reach 71' of the belt 71 to grip it between the gripping shoe 105 and the opposite side wall of the housing 76.

In this position the carriage or carrier 20 moves towards the knife until the off-set end 107 of the gripping shoe 105 engages a resilient abutment 125 mounted in a housing 126 carried by the housing 26 (Figure 4), whereupon the lever 101 is rocked in a counter-clockwise direction about its pivotal point upon the bolt or shaft 100. This movement disengages the gripping face of the gripping shoe 105 from the reach 71' of the belt 71 and simultaneously through the pull exerted upon the lever 81 by the link 110, rocks the lever 81 about its pivotal point on the bolt or shaft 100. Thereby the gripping face 86 on gripping shoe 85 again engages the reach 70² of the belt 70 to retract the table or carrier 20 from the knife. This sequence of operations alternately connects the carriage or table with the oppositely disposed reaches of the two belts 70 and 71 and consequently reciprocates the carriage or carrier relative to the knife.

To adjust the length of stroke, the bar 154 and the abutment 120 are adjusted by grasping the operating knob or handle 155, and rocking the sleeve 153 about the rod or bar 150. The bar 154 is depressed against the tension of the spring 159 to release the lug 158 from its engagement between the teeth of the toothed bar 156. The sleeve 153 is then free to slide along the bar or rod 150 to any preselected position. Upon proper adjustment, the operating knob or handle is released and, under the influence of the spring 159, the sleeve 153 is rocked upon the rod or bar 150 to move the lug or tooth 158 into engagement between the teeth 157 of the toothed bar 156 thereby locking the abutment in such adjusted position. When the abutment 120 is adjusted to the position shown in Figure 1, the table or carrier will traverse its full length of travel. To reduce this distance the abutment 120 may be moved to a point closer to the abutment 125.

Since the belt 70 travels at a higher linear speed than the belt 71, the table or carrier will travel faster during its movement away from the knife. The movement of the table or carrier away from the knife is an idle movement in which no cutting operation is being performed and a fast travel is desirable to speed up the operation of the machine.

The stroke adjustment serves still further to speed up the operation of the machine. For example, in a meat slicing machine, a large piece of meat such as a ham, may require the full movement of the table or carrier, while a bologna may require a lesser movement permitting a cutting operation of shorter duration. Any movement of the table or carrier, beyond that necessary to perform the cut, is a waste of time and where such articles are sliced in large quantities for retail package trade the saving of time and of wear and tear upon the machine is extremely desirable.

Changes may be made in the form, construction and arrangement of the parts without departing from the spirit of the invention, and the right is hereby reserved to make all such changes as fairly fall within the scope of the following claims.

Having thus described the invention, what is claimed as new is:

1. In a mechanism of the type described in combination, two parallel belts, means for driving said belts, a reciprocating feed mechanism operated by said belts, said feed mechanism including a housing through which the belts pass, a carrier operated by said housing and movable thereby through zones of predetermined lengths, means for operatively connecting said housing to said carrier, a pair of belt gripping shoes carried by the housing, one of said shoes being adapted to alternately grip and release one of the reaches of one of said belts, the other of said shoes being adapted to alternately grip and release the opposite reach of the other of said belts thereby to alternately operatively connect the housing with oppositely disposed reaches of said belts, means for moving said gripping shoes alternately into and out of gripping relation with their respective belt reaches, and means adapted to determine any preselected one of several alternative lengths of travel of said carrier.

2. In a mechanism of the type described in combination, two parallel belts, means for driving said belts, a reciprocating feed mechanism operated by said belts, said feed mechanism including a housing through which the belts pass, a carrier operated by said housing and movable thereby through zones of predetermined lengths, means for operatively connecting said housing to said carrier, a pair of belt gripping shoes carried by the housing, one of said shoes being adapted to alternately grip and release one of the reaches of one of said belts, the other of said shoes being adapted to alternately grip and release the opposite reach of the other of said belts thereby to alternately operatively connect the housing with oppositely disposed reaches of said belts, means operating upon either gripping shoe while in operative engagement with its respective belt reach to release it from said operative engagement and to effect operative engagement of the other belt shoe with its respective belt reach, and means adapted to determine any preselected one of several alternative lengths of travel of said carrier.

3. In a mechanism of the type described in combination, two parallel belts, means for driving said belts in one direction simultaneously at different speeds, a reciprocating feed mechanism operated by said belts, said feed mechanism including a housing through which the belts pass, a carrier operated by said housing and movable thereby through zones of predetermined lengths, means for operatively connecting said housing to said carrier, a pair of belt gripping shoes carried by the housing one of said shoes being adapted to alternately grip and release one of the reaches of one of said belts, the other of said shoes being adapted to alternately grip and release the opposite reach of the other of said belts thereby to alternately operatively connect the housing with oppositely disposed reaches of said belts thereby to move the housing and the carrier in opposite directions at different rates of speed, and means for moving said gripping shoes alternately into and out of gripping relation with their respective belt reaches.

4. In a mechanism of the type described in combination, two parallel belts, means for driving said belts, a reciprocating feed mechanism operated by said belts, said feed mechanism including a housing through which the belts pass, a carrier operated by said housing and movable thereby through zones of predetermined lengths, means for operatively connecting said housing to said carrier, a pair of belt gripping shoes carried by the housing, one of said shoes being adapted to alternately grip and release one of the reaches of one of said belts, the other of said shoes being adapted to alternately grip and release the opposite reach of the other of said belts thereby to alternately connect the housing with oppositely disposed reaches of said belts, means operating upon either of said gripping shoes while in gripping engagement with its respective belt reach to move such shoe out of engagement with its respective belt reach, means operated by said shoe in its movement to releasing position for moving the other gripping shoe into gripping engagement with its respective belt reach, and means adapted to determine any preselected one of several alternative lengths of travel of said carrier.

5. In a mechanism of the type described, in combination with oppositely moving parallel belt reaches, a reciprocating feed mechanism including a housing through which the belt reaches pass, a carrier operated by said housing and movable thereby through zones of predetermined length, means for operatively connecting the housing to the carrier, means for alternately connecting the housing to the belt reaches, said last mentioned means including a pair of levers pivotally mounted in the housing, a link pivotally connecting said levers for simultaneous operation thereof, a belt gripping shoe pivotally connected to each of said levers, abutment means for alternate engagement with either of the belt gripping shoes to effect rocking of its respective lever to operate the other lever and gripping shoe through the medium of the connecting link, and means adapted to determine any preselected one of several alternative lengths of travel of said carrier.

6. In a mechanism of the type described in combination with oppositely moving parallel belt reaches, a reciprocating feed mechanism including a housing through which the belt reaches pass, a carrier operated by said housing and movable thereby through zones of predetermined length, means for operatively connecting the housing to the carrier, means for alternately connecting the housing to the belt reaches, said last mentioned means including a pair of levers pivotally mounted in the housing, a link pivotally connecting said levers for simultaneous operation thereof, a belt gripping shoe pivotally connected to each of said levers, each of said belt gripping shoes having an end extension projecting beyond the housing, abutment means for alternate engagement with the end extension of either of the gripping shoes to effect rocking of its respective lever to operate the other lever and gripping shoe through the medium of the connecting link, and means adapted to determine any preselected one of several alternative lengths of travel of said carrier.

7. In a mechanism of the type described in combination with oppositely moving parallel belt reaches a reciprocating feed mechanism including a housing through which the belt reaches pass, a carrier operated by said housing and movable thereby through zones of predetermined length, means for operatively connecting the housing to the carrier, means for alternately connecting the housing to the belt reaches, said last mentioned means including a pair of levers pivotally mounted in the housing, a link pivotally connecting said levers for simultaneous operation thereof, a belt gripping shoe pivotally connected to each of said levers, abutments for alternate engagement with the belt gripping shoes when in engagement with one of the belt reaches, to disengage the shoe relative to the belt reach and through the medium of the pivoted levers and connected link, effect a movement of the other gripping shoe into gripping engagement with a belt reach and to retain the first mentioned shoe out of gripping engagement with a belt reach, and means adapted to determine any preselected one of several alternative lengths of travel of said carrier.

8. In a belt drive and reversing transmission, two endless parallel belts, means for driving one of said belts at a different linear speed than the other of said belts, and a reversing gripping means adapted to grip one of the reaches of one of said belts during one interval of its travel and to grip one of the reaches of the other of said belts during another interval of its travel, whereby the linear speed of said reversing gripping means will be different during various intervals of its travel.

9. In a belt drive and reversing transmission, a drive means including spaced reaches, said means being so constructed and arranged that there is a differential between the speed of one of the reaches of said drive means and the speed of another of the reaches of said drive means.

10. In a belt drive and reversing transmission, a reversing gripping means comprising a housing, a pair of flattened belt gripping shoes arranged in opposite sides of said housing, a shoe supporting lever for each of said shoes, each lever being pivotally mounted within said housing at the side thereof opposite from the side in which its shoe is arranged, and a connecting link between said levers whereby the engagement of one belt gripping shoe with the belt drive will cause a disengagement of the other of said belt gripping shoes with the belt drive.

11. A slicing machine embodying a base, a carriage slidably mounted above the base in a rectilinear path, a knife, means to drive the knife, means selectively to drive the carriage, said last named means comprising a plurality of driving means each having spaced reaches, means on the carriage having selective gripping engagement with a certain reach of the respective driving means to reciprocate the carriage by selective engagement of the means on the carriage with the reaches, and means to effect accelerated movement of the carriage in one direction during gripping engagement with a certain reach, the last said means embodying means to actuate one of the driving means at a different rate of speed than the other driving means.

MORRIS BRUSTOWSKY.

REFERENCES CITED

The following references are of record in the file of this patent:

UNITED STATES PATENTS

| Number | Name | Date |
| --- | --- | --- |
| 364,441 | Rohlmann | June 7, 1887 |
| 1,538,086 | Buttress | May 19, 1925 |
| 1,774,356 | Cloud | Aug. 26, 1930 |
| 1,960,026 | Reussenzehn | May 22, 1934 |

FOREIGN PATENTS

| Number | Country | Date |
| --- | --- | --- |
| 222,322 | German | May 23, 1910 |